United States Patent
Medvinsky et al.

(10) Patent No.: US 9,055,107 B2
(45) Date of Patent: Jun. 9, 2015

(54) AUTHENTICATION DELEGATION BASED ON RE-VERIFICATION OF CRYPTOGRAPHIC EVIDENCE

(75) Inventors: Gennady Medvinsky, Redmond, WA (US); Nir Nice, Kfar Veradim (IL); Tomer Shiran, Haifa (IL); Alexander Teplitsky, Afula (IL); Paul Leach, Seattle, WA (US); John Neystadt, Kfar-Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 949 days.

(21) Appl. No.: 11/607,720

(22) Filed: Dec. 1, 2006

(65) Prior Publication Data

US 2008/0134311 A1 Jun. 5, 2008

(51) Int. Cl.
*H04L 29/06* (2006.01)
*G06F 21/33* (2013.01)
*H04L 9/32* (2006.01)

(52) U.S. Cl.
CPC ........ *H04L 63/166* (2013.01); *H04L 29/06965* (2013.01); *G06F 21/33* (2013.01);
(Continued)

(58) Field of Classification Search
CPC ... H04L 63/0823; H04L 63/30; H04L 63/306; H04L 63/166; H04L 9/3294; H04L 9/3263; H04L 29/06; H04L 29/06551; H04L 29/06965; H04L 29/06945
USPC ......... 380/259, 260, 262, 272, 277, 278, 279, 380/286; 713/150, 151, 153, 155, 156, 157, 713/158, 159, 168, 170, 171, 175, 176, 178, 713/180; 726/2, 3, 4, 5, 6, 7, 8, 10, 11, 12, 726/14, 26, 27, 28, 29, 30
See application file for complete search history.

(56) References Cited

U.S. PATENT DOCUMENTS 5,586,260 A * 12/1996 Hu .................................. 726/12
6,128,738 A 10/2000 Doyle et al.
(Continued)

FOREIGN PATENT DOCUMENTS

JP 2002-244557 A 8/2002
JP 2003-503963 1/2003
(Continued)

OTHER PUBLICATIONS

"AccessMatrix™ Universal Authentication Server (UAS)," http://www.i-sprint.com/product_uas.htm.
(Continued)

*Primary Examiner* — Eleni Shiferaw
*Assistant Examiner* — Hilary Branske
(74) *Attorney, Agent, or Firm* — Timothy Churna; Kate Drakos; Micky Minhas

(57) ABSTRACT

The method of delegating authentication, within a chain of entities, relies upon a recording of at least a portion of a TLS handshake between a gateway device and user, in which the user needs access to a desired server. The method then relies upon re-verification of cryptographic evidence in the recorded portion of the TLS handshake, which is forwarded either (1) to the server to which access is desired, in which case the server re-verifies the recorded portion to confirm authentication, or, (2) to a third party entity, in which case the third party entity confirms authentication and provides credentials to the gateway server which then uses the credentials to authenticate to the server as the user.

20 Claims, 6 Drawing Sheets

(52) U.S. Cl.
CPC ...... *G06F2221/2115* (2013.01); *H04L 9/3213* (2013.01); *H04L 9/3263* (2013.01); *H04L 9/3271* (2013.01); *H04L 63/0823* (2013.01); *H04L 2209/38* (2013.01)

(56) References Cited

U.S. PATENT DOCUMENTS

| | | | |
|---|---|---|---|
| 6,148,404 | A | 11/2000 | Yatsukawa |
| 6,367,009 | B1 | 4/2002 | Davis et al. |
| 6,438,550 | B1 | 8/2002 | Doyle et al. |
| 6,643,774 | B1 | 11/2003 | McGarvey |
| 6,742,114 | B1 | 5/2004 | Carter et al. |
| 6,931,528 | B1 * | 8/2005 | Immonen ............ 713/151 |
| 6,934,848 | B1 | 8/2005 | King et al. |
| 7,069,439 | B1 | 6/2006 | Chen et al. |
| 2003/0014624 | A1 * | 1/2003 | Maturana et al. ........... 713/151 |
| 2003/0018913 | A1 | 1/2003 | Brezak et al. |
| 2003/0163704 | A1 * | 8/2003 | Dick et al. ............. 713/178 |
| 2003/0226017 | A1 * | 12/2003 | Palekar et al. ........... 713/168 |
| 2004/0073801 | A1 | 4/2004 | Kalogridis et al. |
| 2004/0088582 | A1 * | 5/2004 | Hovmark et al. .......... 713/201 |
| 2004/0103283 | A1 | 5/2004 | Hornak |
| 2004/0210756 | A1 | 10/2004 | Mowers et al. |
| 2005/0138426 | A1 * | 6/2005 | Styslinger ............... 713/201 |
| 2006/0174323 | A1 | 8/2006 | Brown et al. |
| 2007/0294749 | A1 | 12/2007 | Nice et al. |
| 2008/0022374 | A1 * | 1/2008 | Brown et al. ................ 726/5 |
| 2008/0046727 | A1 * | 2/2008 | Kanekar et al. ............. 713/168 |

FOREIGN PATENT DOCUMENTS

| | | |
|---|---|---|
| JP | 2003-124926 A | 4/2003 |
| JP | 2003-229849 | 8/2003 |
| JP | 2003-229849 A | 8/2003 |
| JP | 2006-165678 | 6/2006 |
| JP | 5334320 B2 | 11/2013 |
| KR | 1020060040661 | 5/2006 |
| KR | 1020060068531 | 6/2006 |
| WO | 01/03398 | 1/2001 |
| WO | 02/33884 A2 | 4/2002 |
| WO | 2005/025174 A1 | 3/2005 |

OTHER PUBLICATIONS

"bPositive The Easiest and Strongest Two-Factor Authentication Solution," bPositive The Easiest and Strongest Two-Factor Authentication Solution.

Chapman, et al., "OMII Grid Security Technology Overview," Date: Jul. 29, 2005, http://omii.ac.uk/dissemination/SecurityOverview.pdf.

Kawakura, et al., "Flexible and Scalable Credential Structures: NetBill Implementation and Experience," Date: Jul. 1999, p. 231-245, http://www.cs.berkeley.edu/~tygar/papers/Flexible_scalable_credential.pdf.

Notice of Rejection issued Nov. 9, 2012 in connection with corresponding Japanese Application No. 2009-539518 with English Language translation (10 Pages).

Matthew Hur, Joseph Salowey, Ari Medvinsky, "Kerberos Cipher Suites in Transport Layer Security (TLS)," Internet-Draft Transport Layer Security Working Group draft-ietf-tls-kerb-01.txt, [online], Nov. 8, 2001 Obsoletes: RFC 2712, [retrieved on Oct. 30, 2012]. Retrieved from the Internet, URL, <http://tools.ietf.org/pdf/draft-ietf-tls-kerb-01.pdf> (9 pages).

K. Jackson, S. Tuecke, D. Engert, "TLS Delegation Protocol," Internet Draft, [online], Feb. 2002, draft-ietf-tls-delegation-01.txt, [retrieved on Oct. 30, 2012]. Retrieved from the Internet, URL, <http://tools.ietf.org/pdf/draft-ietf-tls-delegation-01.pdf> (10 pages).

"Notice of Reexamination Received for China Patent Application No. 200780044272.X", Mailed Date: Oct. 25, 2013, Filed Date: Nov. 30, 2007, 12 Pages.

"Notice of Allowance Received for Taiwan Patent Application No. 96144323", Mailed Date: Oct. 31, 2013, Filed Date: Nov. 22, 2007, 4 Pages.

"Japanese Office Action", Application No. 2013-024845, Mailed Date: Jan. 20, 2014, Filed Date: Nov. 30, 2007, 10 Pages.

English translation of Japanese Office Action, Application No. 2013-024845, Mailed Date: Jan. 20, 2014, Filed Date: Nov. 30, 2007, 11 Pages.

"China Notice on Reexamination", Application No. 200780044272.X, Mailed Date: Mar. 25, 2014, Filed Date: Nov. 30, 2007, 13 Pages.

"PCT Preliminary Report on Patentability", Application No. PCT/US2007/086122, Mailed Date: Jun. 3, 2009, Filed Date: Nov. 30, 2007, 6 Pages.

"Korean Patent Office—Notice of Final Rejection" with English translation, Application No. 020978333, Mailed Date: Mar. 26, 2014, Filed Date: Nov. 30, 2007, 5 Pages.

"China—Notice of the First Office Action" with English translation, Application No. 200780044272.X, Mailed Date: Feb. 24, 2011, Filed Date: Nov. 30, 3007, 13 Pages.

"China—Decision on Rejection" with English translation, Application No. 200780044272.X, Mailed Date: Jan. 6, 2012, Filed Date: Nov. 30, 2007, 12 Pages.

"Supplementary European Search Report", Application No. 07873646.9, Mailed Date: Jun. 5, 2012, Filed Date: Nov. 30, 2007, 5 Pages.

"Japan Patent Office—Notice of Allowance" with English translation, Application No. 2009-539518, Mailed Date: Jun. 28, 2013, Filed Date: Nov. 30, 2007, 6 Pages.

"Taiwan Office Action". Mailed Date: May 30, 2013, Application No. 096144323, Filed Date: Nov. 22, 2007, pp. 16.

Hughes Jr. Larry J., "Translation Supervisor: Koji Nagahara, Internet Security, 1st Ed., Impress Corporation, Japan", Retrieved at <<http://books.google.com/books?id=tjO-8ctawTsC&lpg=PR1&vq=120-121&pg=PA127#V=onepage&q&f=true>>, Feb. 21, 1997, pp. 37.

"Korean Office Action", Mailed Date: Nov. 15, 2013, Application No. 10-2009-7013796, Filed Date: Nov. 30, 2007, pp. 9.

"Notice of Allowance Received for Japan Patent Application No. 2013-024845", Mailed Date: Jul. 15, 2014, Filed Date: Nov. 30, 2007, 8 Pages.

"Notice of Allowance Received for Korean Patent Application No. 10-2009-7013796" with English translation, Mailed Date: Aug. 11, 2014, Filed Date: Nov. 30, 2007, 4 Pages.

* cited by examiner

AUTHENTICATION DELEGATION BASED ON RE-VERIFICATION OF CRYPTOGRAPHIC EVIDENCE

BACKGROUND

An organization may have a chain of entities that together provide some service to a user. Access to resources such as data, web pages, functional software operations, and the like needs to be limited to a set of known and authorized users. Various access control schemes have been developed to prevent unauthorized users and malicious attackers from gaining access to computer resources, including mechanisms used to authenticate the identity of a user who is attempting to access web resources. In particular, due to the increase in identity theft attacks (e.g., phishing, pharming), two-factor authentication is becoming popular.

Two-factor authentication (T-FA) is any authentication protocol that requires two different ways to establish identity and privileges. Common implementations of two-factor authentication use "something you know" (e.g., a password or personal identification number) as one of the factors, and use either "something you have" (e.g., a credit card or hardware token) or "something you are" (e.g., a fingerprint or retinal pattern) as the other factor. For example, smart cards are one of the methods for providing two-factor authentication. A smart card is an example of a hardware token and typically contains a microprocessor that is capable of executing various security operations such as performing cryptographic functions on provided data. A smart card usually holds one or more International Telecommunications Union (ITU-T) X.509 certificates (and their associated private keys) which can be used for protocols that require certificate-based authentication. SSL (Secure Socket Layer), TLS (Transport Layer Security), and Kerberos (with PKINIT, short for "Public Key Cryptography for Initial Authentication in Kerberos") are all examples of such protocols.

A smart card is not required in order to use a certificate. Many devices (e.g., computers, mobile phones) are capable of storing and using certificates (and their associated private keys). For example, Windows Mobile 5.0 can use a certificate to authenticate to an Exchange 2003 SP2 server in order to synchronize email and calendar information (via the Exchange ActiveSync protocol which runs on top of SSL or TLS).

Protecting identity theft attacks upon the chain of entities of an organization's network, including for example, a gateway device on the edge of the network providing Web-based access to Web servers that are located on the organization's internal network (intranet), is critical.

Authentication Delegation is broadly defined as a case in which a client delegates authentication to a server, or more specifically, allowing a third-party authentication service (or gateway) that can access resources (or a server) to authenticate on behalf of a user (by essentially impersonating the user). The accessed server will base its authorization decisions upon the user's identity, rather than based upon the authentication service's account.

This Background is provided to introduce a brief context for the Summary and Detailed Description that follows. This Background is not intended to be an aid in determining the scope of the claimed subject matter nor be viewed as limiting the claimed subject matter to only those implementations that may solve any or all of the disadvantages or problems presented above.

SUMMARY

Authentication delegation based on re-verification or cryptographic evidence utilizes a recording of at least a portion of a TLS handshake between a gateway device and a user when the user desires access to a particular server within a chain of entities. Cryptographic evidence is provided by forwarding the recorded portion of the TLS handshake to either (1) the desired server, in which case the server re-verifies the recorded portion to confirm authentication, or, (2) a third party entity, in which case the third party entity confirms authentication by re-verifying the recorded portion and providing user credentials to the gateway, which then, in turn, uses the credentials to authenticate to the server as the user. In each case, the server and the third party entity make the decision whether to grant user access using the recorded portion of TLS handshake without being involved in the authentication between the user and the gateway device.

In various illustrative examples, the cryptographic evidence includes a timestamp to provide an additional measure of security by ensuring that the TLS handshake is timely (i.e., "fresh"). In addition, upon confirming a valid TLS handshake, the third party entity may be arranged to issue temporal (i.e., time-limited) user credentials to enable the gateway to authenticate to the desired server on behalf of the user, using Kerberos with PKINIT, for example.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
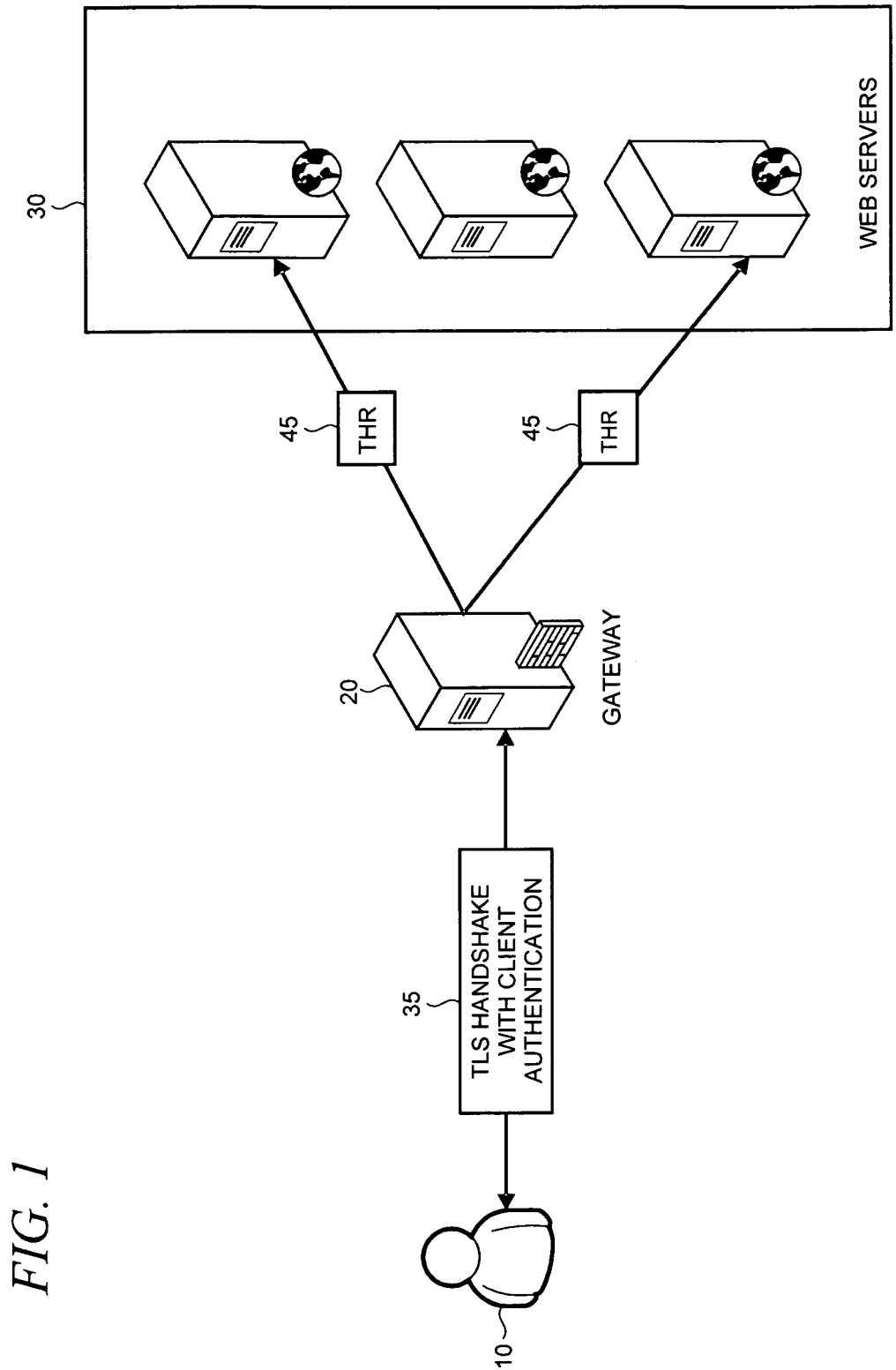
FIG. 1 is a simplified functional block diagram of an illustrative architecture for authentication delegation based upon re-verification of TLS handshake messages.

An illustrative context for the present authentication delegation based on re-verification or cryptographic evidence is one in which a client/user accesses one or more service providers through a gateway. However, it is emphasized that this context is merely illustrative as other contexts and environments may also be suitable. For example, the present authentication delegation may be used when a Web server needs to authenticate as a user to a back-end application or database, or alternatively in any setting where there is a chain of entities and authentication is needed between entities in the chain.

In the access context, a gateway device provides access to Web servers where a user submits a request which reaches the gateway and eventually the internal Web server. However, both the gateway and the Web server typically require some form of authentication in order to decide whether or not the connecting user is allowed to access the desired resource.

If the gateway is configured to use forms-based authentication (FBA), it will require the user to enter a username and password in a logon form. The user then submits the form and the gateway receives the user's username and password. The gateway can then use those credentials to authenticate on behalf of the user to the internal Web server. This is very simple and is possible because the gateway receives the password and can use it as it desires. However, with some authentication schemes this is not possible. For example, if the user authenticates to the gateway using an authentication scheme that does not provide the password, the gateway does not have any credentials that it may reuse to authenticate to the internal Web server on behalf of the user.

Some solutions to this problem have been proposed. For example, one solution involves a "trusted third party". Here, the trusted third party is configured in advance to "trust" the gateway to authenticate on behalf of all the users to a defined set of Web servers (or services in general). This technique may be implemented as a protocol that allows the gateway (or front-end server) to request tickets on behalf of a client for use with other servers. The trusted third party is then willing to provide service tickets to the gateway on behalf of any user so that the gateway can then impersonate any user.

The trusted third party can also be configured to provide service tickets under a specific condition. For example, in the Kerberos protocol, a client authenticates to the gateway via a service ticket, and Kerberos constrained delegation provides a method by which the trusted third party (Key Distribution Center) can be configured to impose such a condition. In this case, the gateway must provide evidence that the claimed user indeed authenticated to the gateway (via a service ticket), which is important to increase the overall security of the system. For example, an advantage to requiring such evidence is that a compromised gateway would not be able to gain access to the server on behalf of user without that user first properly authenticating to the gateway.

While these proposals provide ways in which to address authentication without a password, in some cases it may be desirable to implement an authentication delegation model that does not involve a Key Distribution Center (KDC) or other trusted third-party entity. In such a model, the gateway would authenticate to the internal Web server on behalf of the user without any communication with a KDC. There are many solutions that provide this kind of functionality. For example, some products can be installed/configured on a gateway and any number of internal Web servers so that once a user authenticates to the gateway, the gateway returns a token (an HTTP—Hypertext Transfer Protocol—cookie in some cases) which is trusted by the internal Web servers. As with the other proposals, one problem with this model is that the gateway is a completely trusted entity, thereby reducing the overall security of the system.

The present arrangement provides authentication delegation based on re-verification of cryptographic evidence. A gateway (or front end server) provides access to a Web server (or back end server). The client/user authenticates to the gateway using a TLS handshake with client authentication. A recording of the TLS handshake, or at least enough of the TLS handshake to prove that the user is authenticated to the gateway, is then provided either to the Web server (which re-verifies the validity of the handshake) or to a third party entity (which upon verifying the recording, provides user credentials to gateway which then authenticates to the Web server).

Turning now to the drawings where like reference numerals indicate like elements, FIG. 1 illustrates an exemplary network architecture in which the present authentication delegation is utilized. A client/user computer system 10 is operatively coupled to gateway 20 (also referred to as an authentication server), allowing communication between client/user 10 and a network of Web servers 30 (also referred to as network servers). Gateway 20 contains a database/directory (not shown) including information necessary to authenticate users (alternatively, the gateway may communicate over the network with an external user database/directory). In response to logging on, user/client 10 first authenticates to gateway 20 via a TLS handshake with client authentication as indicated by reference numeral 35. Note that client authentication is intentionally mentioned here, because client authentication is optional in the TLS Handshake protocol.

The TLS protocol provides communications privacy over the Internet, and allows client/server applications to communicate in a way that is designed to prevent eavesdropping, tampering or message forgery. The TLS Handshake protocol allows the server and client to authenticate each other and to negotiate an encryption algorithm and cryptographic keys before the application protocol transmits or receives its first byte of data.

One advantage of TLS is that it is application protocol-independent. Higher level protocols can thus layer on top of the TLS protocol transparently. The TLS Handshake protocol can be summarized as follows: the user/client sends a client hello message to which the server (in FIG. 1, the gateway 20) must respond with a server hello message, or else a fatal error will occur and the connection will fail). The client hello and server hello are used to establish security enhancement capabilities between the client and server.

Figure 6:
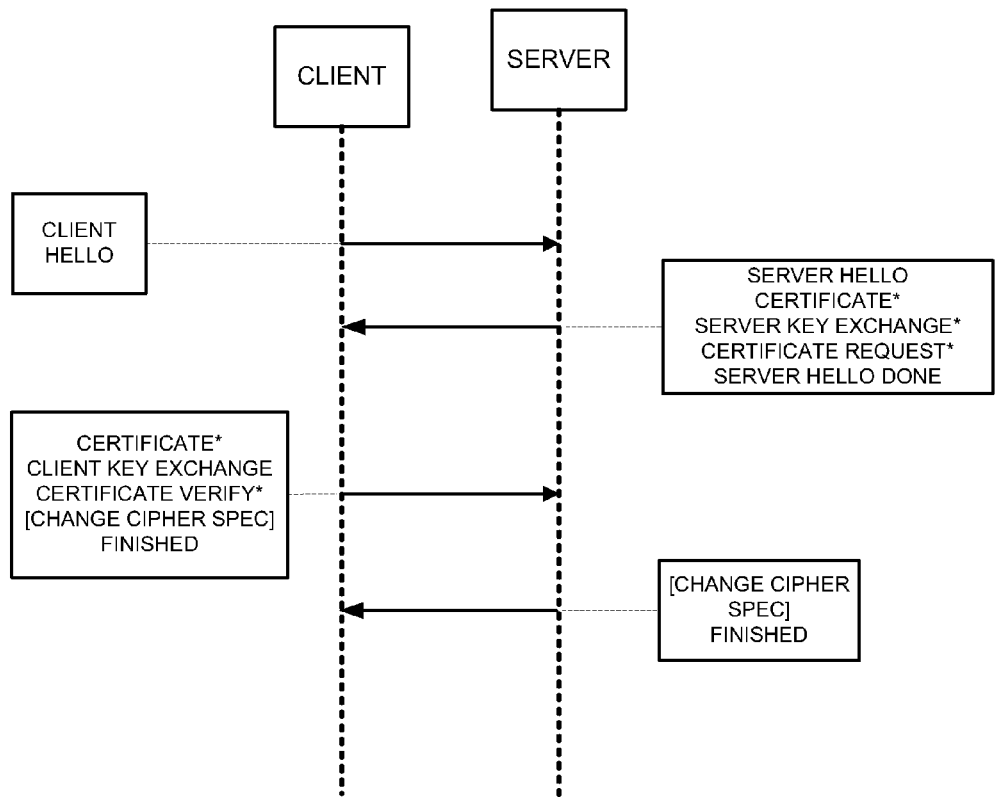
FIG. 6 is a schematic message flow diagram illustrating the exchange of messages between a client and a server during a typical TLS handshake phase.

FIG. 6 is a schematic message flow diagram illustrating the exchange of messages between a client and a server during a typical TLS handshake phase. The TLS protocol is described in detail in RFC2246, The TLS Protocol, Version 1.0, the disclosure of which is incorporated by reference herein. The client/user communicates with the gateway device in a client-server relationship.

More specifically, as illustrated in FIG. 6, the actual key exchange uses up to four messages: the server certificate, the server key exchange, the client certificate, and the client key exchange. New key exchange methods can be created by specifying a format for these messages and defining the use of the messages to allow the client and server to agree upon a shared secret. Following the hello messages, the server will send its certificate, if it is to be authenticated. Additionally, a server key exchange message may be sent, if it is required (e.g. if their server has no certificate, or if its certificate is for signing only).

If the server is authenticated, it may request a certificate from the client, if that is appropriate to the cipher suite selected. The server will then send the server hello done message, indicating that the hello-message phase of the handshake is complete. The server will then wait for a client response. If the server has sent a certificate request message, the client must send the certificate message. The client key exchange message is sent, and the content of that message will depend on the public key algorithm selected between the client hello and the server hello. If the client has sent a certificate with signing ability, a digitally-signed certificate verify message is sent to explicitly verify the certificate.

Returning to FIG. 1, in this illustrative example, gateway 20 creates a recording (illustrated in FIG. 1 as THR with a reference numeral 45) of the data that was exchanged as part of this handshake. More particularly, the recording includes at least the data up to the certificate verify message, which consists of a signature on all of the previous messages of the TLS handshake, and proves that the user/client 10 indeed possesses the private key that matches the certificate.

The TLS handshake recording, or THR, is then provided directly to internal Web Servers 30 as authenticating evidence (i.e., "proof") that the user/client 10 authenticated to gateway 20.

The internal Web servers 30 are not involved in the authentication between client/user 10 and gateway 20, but rather, are simply provided with the authenticating evidence (i.e., the THR) of the authentication between client/user 10 and gateway 20, to then make a decision as to whether to provide access to the desired resource.

Note that the proposed scheme can only be used when the TLS handshake includes a certificate verify message. This message is not used when any of the following conditions are true:
1) The TLS handshake does not include client authentication.
2) The client and gateway decide to resume a previous TLS session or duplicate an existing session (instead of negotiating new security parameters). In this case, the TLS handshake does not contain a certificate verify message (see pages 30-31 in RFC 2246).
3) The client certificate has signing capabilities (i.e., all certificates except those containing fixed Diffie-Hellman parameters). For example, the cipher suites ECDH_ECDSA and ECDH_RSA (see RFC 4492) support client authentication but do not utilize a certificate verify message.

Figure 2:
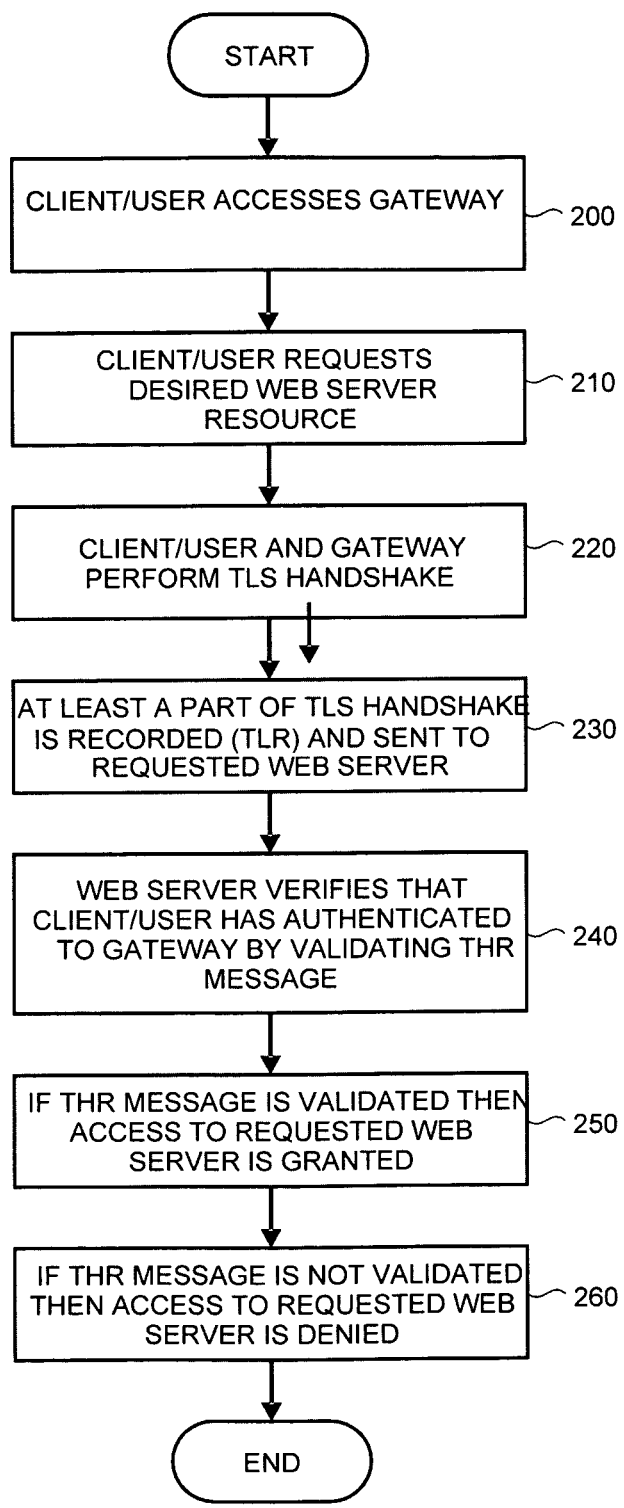
FIG. 2 is An illustrative flow diagram showing the steps of an authentication process utilizing the exemplary architecture of FIG. 1.

FIG. 2 is an illustrative flow diagram for the authentication process that is performed when a client/user seeks access to the Web servers in the exemplary architecture shown in FIG. 1. The process begins when the client/user desires a Web server resource, and accesses the gateway 20 (step 200). If the client/user is not logged into the Web server, the client/user must be authenticated before the Web server will allow access.

The client/user then requests the desired Web server resource (step 210). To authenticate the client/user, the gateway 20 and the client/user 10 then perform a TLS handshake with client authentication in the manner described in detail above (step 220) (those skilled in the art will appreciate that the gateway 20 may authenticate the client/user 10 immediately, before the client/user requests the desired resource, or after the client/user requests the resource). A recording of at least a part of the TLS handshake is generated and is provided to the requested Web server (step 230).

Upon receiving the THR, the Web server 30 verifies that the client/user has authenticated to the gateway (by validating the signature of the client/user in the certificate verify message in the THR, and in some embodiments, also the timestamp (discussed below) in the THR) (step 240). Assuming that the client/user is authorized to access the Web server, if the THR is verified, access to the requested Web server is granted (step 250), and if the THR cannot be verified, access is denied (step 260).

Should an attacker be able to obtain the THR and attempt to reuse it to impersonate the client/user, there are several techniques and mechanisms envisioned in order to prevent, or at least mitigate, such "replay attacks." First, assuming the server and/or client/user embed time-related data (e.g., a timestamp) in their handshake messages, the service provider (e.g., internal Web server) can check the received THR to confirm that it is "fresh." This solution would typically require the gateway 20 and the Web servers 30 (or the user/clients 10 and the Web servers 30) to have synchronized clocks—although those skilled in the art will appreciate that there are many possible workarounds.

Alternatively, the gateway 20 could ask the service provider (Web servers 30) for a nonce and embed that nonce in one of the messages that it sends to the user/client 10 as part of the TLS handshake. The service provider can then check the received THR to make sure that it includes a nonce that it previously generated and passed to the gateway 20.

Note that in each of these two possibilities, the gateway 20 (or user/client 10) embeds some data in the TLS handshake messages (again, the handshake protocol is essentially a series of sequenced messages that negotiate the security parameters of a data transfer session). This embedding of data would typically be done in one of the following ways:
(1) The server would put a timestamp or nonce in the server hello message, as part of the random field of this message (the details of this aspect of the handshake protocol may be found at section 7.4.1.3 of RFC 2246);
(2) The server would put a timestamp or nonce in a server hello extension (details may be found at section 2.2 of RFC 3546);
(3) The client/user would put a timestamp in the client hello message, as part of the random field of this message (the details of this aspect of the handshake protocol may be found at section 7.4.1.2 of RFC 2246);
(4) The client/user would put a timestamp in a client hello extension (details may be found at section 2.1 of RFC 3546).

Finally, in addition to each of the alternatives described above, the service provider (Web Servers 30) could remember all the THRs that it receives in order to ensure that the same THR is not used more than once. This memory could also be shared between service providers via some shared storage or communication mechanism.

In another illustrative implementation, a "dual" TLS handshake may be used for even further protection against an attacker compromising the gateway or communication channel between the client and the gateway. In this case, the client/user 10 and gateway 20 perform a first TLS handshake without client authentication. When the first TLS handshake is successfully completed, client/user 10 and gateway 20 perform a second TLS handshake with client authentication. The second handshake, which is later used as the evidence (THR), is encrypted for transmission by a session key that the client/user 10 and gateway 20 derived from the first handshake. The THR is thereby protected as it is not sent unencrypted (i.e., in the clear) and even if an attacker was able to compromise the gateway 20, it would be more difficult to obtain the THR.

The embodiment discussed thus far and illustrated in FIG. 1, consists of a user/client 10, gateway 20 and the service providers (Web servers 30). An alternate embodiment, illustrated in FIG. 3, and discussed in further detail below, utilizes a third-party entity 40. In this case, the service providers (Web servers 30) "trust" the third-party entity 40 to provide the real identity of the user. Such a third-party entity 40 can be a Kerberos KDC (as in S4U2Self+S4U2Proxy) or a Certificate Authority (CA). Note that although the third-party entity 40 is illustrated in FIG. 3 as a separate entity, in some configurations the third-party entity (KDC or CA) would reside on the same machine as the gateway 20.

Figure 3:
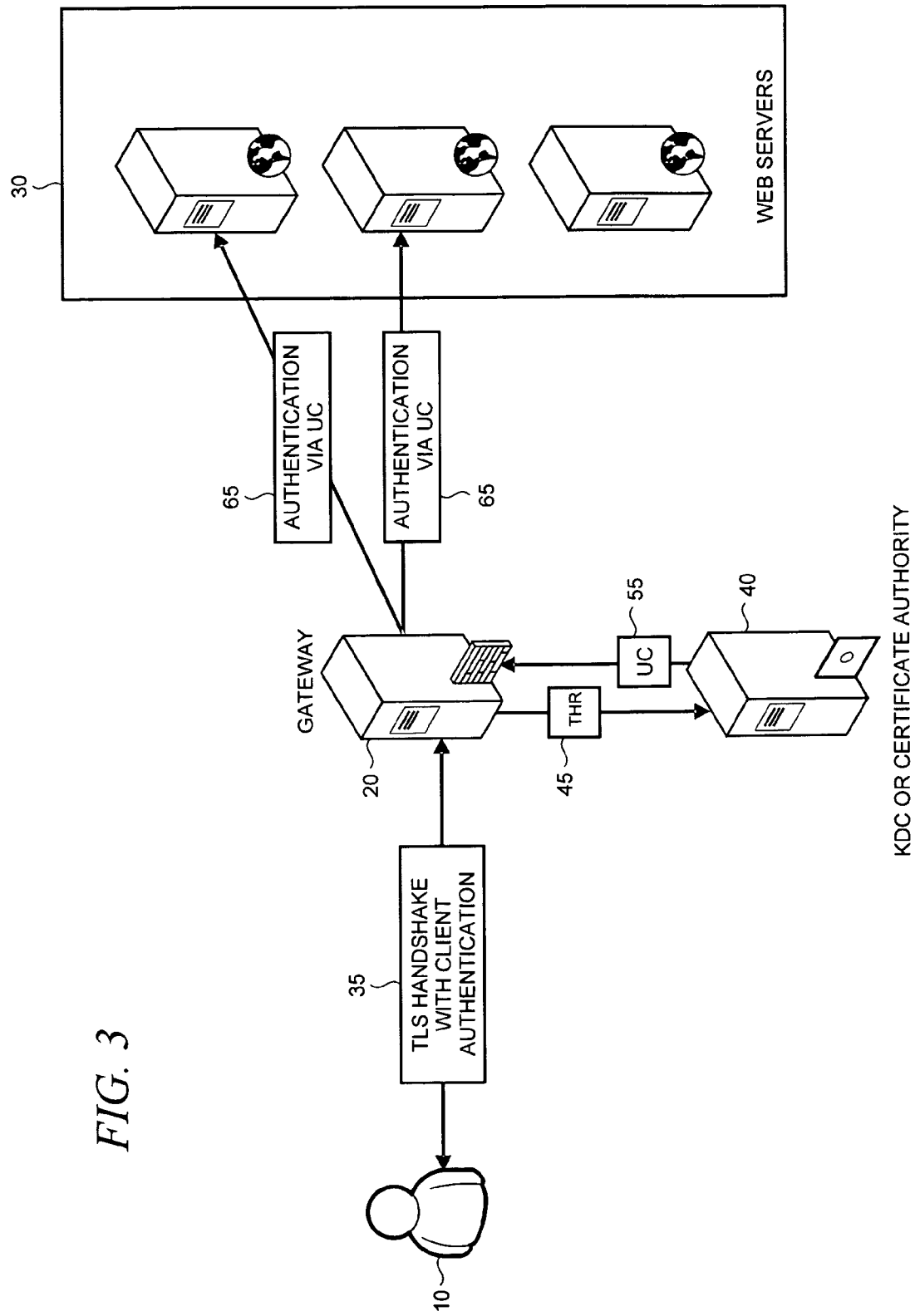
FIG. 3 is a simplified functional block diagram of an illustrative architecture for authentication delegation in which user credentials are provided by a third party entity that receives a recording of at least a portion of a TLS handshake.

Before further specifically discussing the embodiment illustrated in FIG. 3, we will discuss the Kerberos protocol, which involves the use of a trusted third party, known as the KDC, to negotiate shared session keys between clients and services and provide mutual authentication between them.

The corner-stones of Kerberos are the Ticket and the Authenticator. The Ticket encapsulates a symmetric key (the ticket session key—there is only one key, shared between the two endpoints) in an envelope (a public message) intended for a specific service. The contents of the Ticket are encrypted with a symmetric key shared between the service principal and the issuing KDC. The encrypted part of the Ticket contains the client principal name, among other items. An Authenticator is a record that can be shown to have been recently generated using the ticket session key in the associated Ticket. The ticket session key is known by the client who requested the ticket. The contents of the Authenticator are encrypted with the associated ticket session key. The encrypted part of an Authenticator contains a timestamp and the client principal name, among other items.

Figure 4:
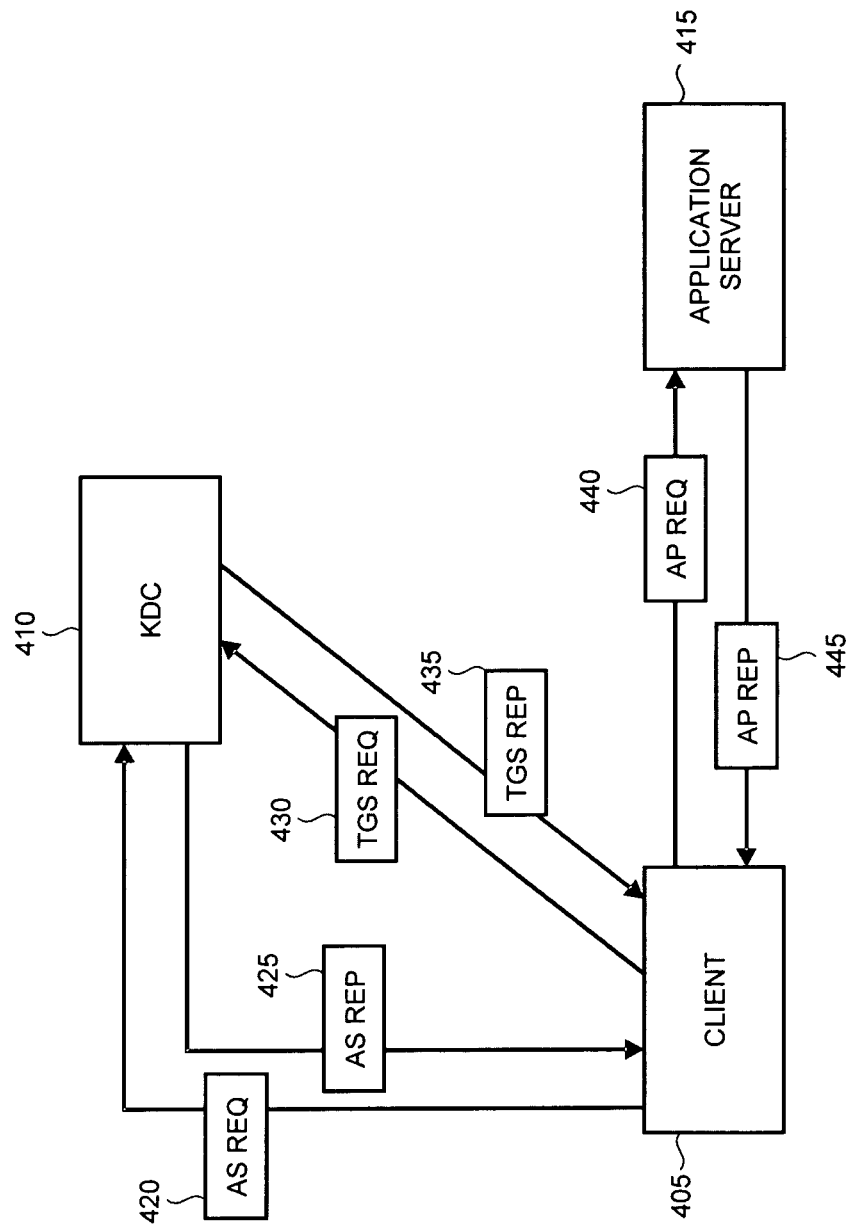
FIG. 4 shows illustrative message exchanges between the client and the Key Distribution Center in the Kerberos (V5) protocol.

As shown in FIG. 4, the Kerberos (V5) protocol consists of the following message exchanges between the client 405 and the KDC 410, and the client 405 and the application server 415:

The Authentication Service (AS) Exchange

The client obtains an "initial" ticket from the Kerberos authentication server (AS), typically a Ticket Granting Ticket (TGT). The AS-REQ message 420 and the AS-REP 425 message are the request and the reply message, respectively, between the client and the AS.

The Ticket Granting Service (TGS) Exchange

The client subsequently uses the TGT to authenticate and request a service ticket for a particular service, from the Kerberos ticket-granting server (TGS). The TGS-REQ message 430 and the TGS-REP 435 message are the request and the reply message respectively between the client and the TGS.

The Client/Server Authentication Protocol (AP) Exchange

The client then makes a request with an AP-REQ message 440, consisting of a service ticket and an authenticator that certifies the client's possession of the ticket session key. The server may optionally reply with an AP-REP message 445. AP exchanges typically negotiate session-specific symmetric keys.

Typically the AS and TGS are integrated in a single device also known as the KDC.

In the AS exchange, the KDC reply contains the ticket session key, among other items, that is encrypted using a key (the AS reply key) shared between the client and the KDC. The AS reply key is typically derived from the client's password for human users. Therefore, for human users, the attack resistance strength of the Kerberos protocol is no stronger than the strength of their passwords.

The use of asymmetric cryptography in the form of X.509 certificates (see RFC 3280 under the "Request for Comments" document series managed by the Internet Society ("ISOC")) is popular for facilitating data origin authentication and perfect secrecy. An established Public Key Infrastructure (PKI) provides key management and key distribution mechanisms that can be used to establish authentication and secure communication. Adding public-key cryptography to Kerberos provides a nice congruence to public-key protocols, obviates the human users' burden to manage strong passwords, and allows Kerberized applications to take advantage of existing key services and identity management.

The advantage afforded by the Kerberos TGT is that the client exposes his long-term secrets only once. The TGT and its associated session key can then be used for any subsequent service ticket requests. One result is that all further authentication is independent of the method by which the initial authentication was performed. Consequently, initial authentication provides a convenient place to integrate public-key cryptography into Kerberos authentication. In addition, the use of symmetric cryptography after the initial exchange is preferred for performance considerations.

RFC 4556 describes the methods and data formats using which the client and the KDC can use public and private key pairs to mutually authenticate in the AS exchange and negotiate the AS reply key, known only by the client and the KDC, to encrypt the AS-REP sent by the KDC.

Returning to FIG. 3, after completion of the TLS handshake (which as also discussed with reference to FIG. 1, can be a "dual" handshake), the gateway 20 provides the THR 45 to the third-party entity 40. As in the case of FIG. 1, again, the "trusting entity" (in this case, the third-party entity 40) makes a decision without being involved in the authentication between the client/user 10 and the gateway 20. Rather, the trusting entity relies upon the THR to determine if it will provide user credentials to the gateway.

More specifically, in exchange for a valid TLS handshake (i.e., the THR), the third party entity 40, returns a form of user credentials (UC) as indicated by reference numeral 55 to the gateway 20. Gateway 20 in turn uses the UC to authenticate to the Web servers 30 as indicated by reference numeral 65. In the case of a KDC, the user credentials would be a Kerberos service ticket or TGT in the name of the user 10. In the case of a CA, the user credentials would be a certificate (usually with a short lifetime) in the name of the user.

Figure 5:
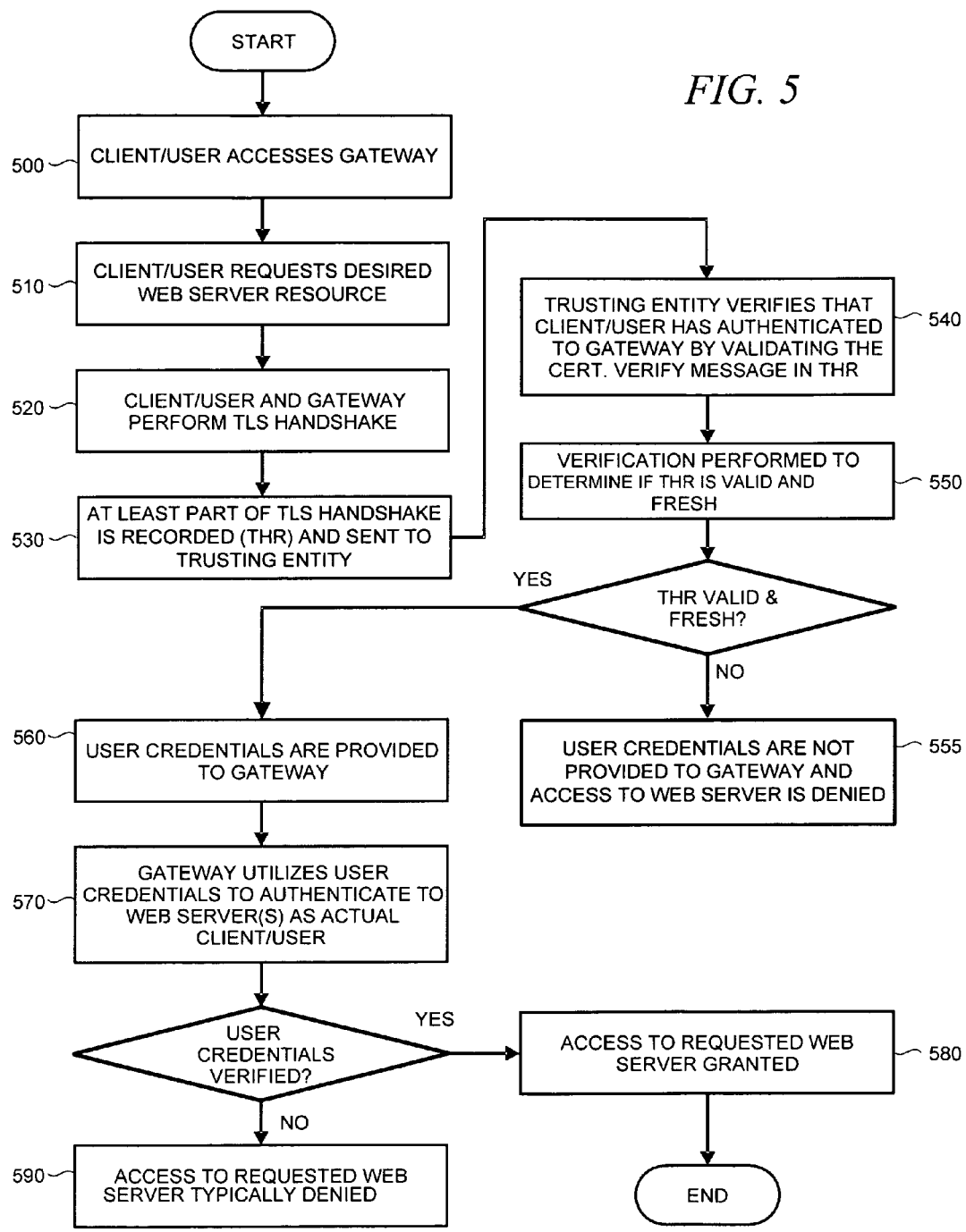
FIG. 5 is an illustrative flow diagram showing the steps of an authentication process utilizing the exemplary architecture of FIG. 3.

FIG. 5 is an illustrative flow diagram showing the steps of the authentication process that are performed when a client/user seeks access to the Web servers in a system that includes a third party entity. In this system, the process begins when the client/user 10 accesses the gateway 20 (step 500). The client/user 10 then requests a desired Web server 30 resource (step 510). If the client/user 10 is not logged into the Web server, the client/user 10 must be authenticated before the Web server 30 will allow access.

The client/user 10 and gateway 20 then perform a TLS handshake with client authentication in the manner described in detail above (step 520). A recording (THR) of at least a part of the TLS handshake is generated and is provided to the third party entity (the "trusting entity") 40 (step 530).

Upon receiving the THR, the third party entity 40 verifies that the user has authenticated to the gateway (by validating the certificate verify message in the THR) (step 540). If the THR is verified as valid and fresh (step 550), user credentials (e.g., a temporal certificate in the case of a Certificate Authority, or a Kerberos service ticket in the case of a KDC) are provided to the gateway 20 (step 560). The gateway 20 then uses the user credentials to authenticate to the Web servers 30 as the actual client/user (step 570). If however, the THR cannot be verified as valid and fresh (at step 550), user credentials are not provided to gateway 20, and access is denied (step 555).

Assuming that the client/user is authorized to access the Web server, if the user credentials (e.g., client certificate) are authenticated by the Web servers 30, access to the requested Web server is granted to the client/user (step 580), and if the client certificate cannot be verified, access is typically denied (step 590).

The user credentials provided to the gateway 20 consist of either a service ticket (in the KDC-based deployment) or a temporal certificate (in the CA-based deployment). The KDC-based deployment is very similar to Kerberos constrained delegation (S4U2Self+S4U2Proxy) discussed above, so it will not be further discussed. Instead, the CA-based (Certificate Authority-based) deployment will be discussed.

In the CA-based deployment, one or more CAs are used to issue a client certificate when provided with a valid and "fresh" THR. In this scenario, the service providers (Web servers 30) must be configured to trust the CA (this typically means that the CA's own certificate must be installed in some specific place on the service provider's operating system) to provide the real identity of the user.

Once given a client certificate in the name of a user (and the associated private key), the gateway 20 would then use those credentials to authenticate to the service providers 30 as the actual user. In order to use the certificate and private key to authenticate to a service provider (e.g., Web server 30), the gateway 20 and the service provider must use an authentication protocol that supports client certificates. Two well-known authentication protocols that support client certificates are: TLS (or SSL)—as discussed in greater detail above, a TLS (or SSL) handshake can include client authentication (based on a certificate); or Kerberos (w/ PKINIT)—The PKINIT mechanism (RFC 4556), entitled "Public Key Cryptography for Initial Authentication in Kerberos", is a mechanism of protocol extensions to the Kerberos protocol that allow a Kerberos-enabled client to obtain a TGT via public key cryptography (i.e., via a certificate and the associated private key). More specifically, these extensions provide a method for integrating public key cryptography into the initial authentication exchange, by using asymmetric-key signature and/or encryption algorithms in pre-authentication data fields.

Assuming that the client/user is authorized to access the Web server, once the credentials (the client certificate) are authenticated by the Web servers 30, access to the requested Web server is granted to the client/user. Of course if the client certificate cannot be verified (or if the Web server is not configured to trust the CA), access to the Web server by the user is denied.

As in the embodiment of FIG. 1, a "dual" TLS handshake may be implemented in the embodiment of FIG. 3, for even additional protection against an attacker compromising gateway 20.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

For example, throughout this document we refer to a chain of entities that consist of a client/user accessing service providers through a gateway. However, this is just one possible scenario, and is used throughout the document for convenience only. Other possible scenarios include a Web server that needs to authenticate as the user to a back-end application or database. The novel aspects of the disclosure are applicable to any chain of entities that require authentication between the entities in the chain. There can be any number of entities in a chain, where each entity must authenticate to the next entity in the chain as the original client.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The words "exemplary" and "illustrative" are used herein to mean serving as an example, instance, or illustration. Any implementation or aspect thereof described herein as "exemplary" or "illustrative" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method of authentication delegation between a client/user accessing a service provider through a gateway, the method comprising the steps of:
performing a Transport Layer Security (TLS) handshake with client authentication between the client/user and the gateway, said TLS handshake with client authentication being defined by a protocol that specifies an exchange of a plurality of messages;
recording at least a sufficient portion of messages of the TLS handshake to indicate that the client/user is authenticated to the gateway, wherein said at least the sufficient portion includes messages specified in the protocol and all messages specified in the protocol up to and including a certificate verify message, wherein said at least the sufficient portion of the messages of the TLS handshake are exchanged between the client/user and the gateway; and
providing the recording of all messages up to and including the certificate verify message, from the gateway to the service provider, wherein all messages provided are digitally signed,
wherein access to the service provider is based on the at least the sufficient portion of the messages of the TLS handshake that are exchanged between the client/user and the gateway.

2. The method of claim 1, wherein the service provider is not involved in the authentication between the client/user and the gateway.

3. The method of claim 1, wherein said providing step provides the recording directly from the gateway to the service provider.

4. The method of claim 1, further comprising the step of embedding timestamp data in messages in the TLS handshake.

5. The method of claim 4, wherein the client/user embeds the timestamp data.

6. The method of claim 4, wherein the gateway embeds the timestamp data.

7. The method of claim 1, further comprising the step of embedding a nonce provided by the service provider in a message from the gateway to the client/user as part of the TLS handshake.

8. The method of claim 1, wherein the service provider maintains a memory of all received recordings and confirms that a same recording is not used more than once.

9. The method of claim 1, wherein the step of performing the TLS handshake further comprises:
performing a first handshake without client authentication; and
upon successful completion of said performing a first handshake, performing a second handshake with client authentication.

10. The method of claim 9, wherein said second handshake between the client/user and gateway is encrypted by a session key derived from said first handshake.

11. The method of claim 10, wherein the recording provided to the service provider is unencrypted.

12. A system, comprising:
at least one processor and at least one memory;
the at least one memory including instructions that when executed on the at least one processor perform actions including:
performing a Transport Layer Security (TLS) handshake with client authentication, the TLS handshake with client authentication being defined by a protocol that specifies an exchange of a plurality of messages;
recording at least a sufficient portion of messages of the TLS handshake to indicate authentication to a gateway, wherein the at least sufficient portion of messages includes messages specified in the protocol up to and including a certificate verify message, wherein the at least sufficient portion of the messages of the TLS handshake are exchanged between a user and the gateway; and
providing the recording of the at least sufficient portion of messages to a service provider, wherein all messages provided are digitally signed,
wherein access to the service provider is based on the at least sufficient portion of the messages.

13. The system of claim 12, wherein performing a TLS handshake further comprises:
performing a first handshake without client authentication; and
upon successful completion of said performing a first handshake, performing a second handshake with client authentication.

14. The system of claim 13, wherein the second handshake is encrypted by a session key derived from said second handshake.

15. The system of claim 12, wherein timestamp data is embedded in at least one of the messages of the TLS handshake and the wherein access to the service provider is based on the timestamp data and the at least sufficient portion of the messages.

16. A machine-readable storage medium, not comprising a signal per se, storing herein at least one computer program that when executed performs actions comprising:
performing a Transport Layer Security (TLS) handshake with client authentication, the TLS handshake with client authentication being defined by a protocol that specifies an exchange of a plurality of messages;
recording at least a sufficient portion of messages of the TLS handshake to indicate authentication to a gateway, wherein the at least sufficient portion of messages includes messages specified in the protocol up to and including a certificate verify message, wherein the at least sufficient portion of the messages of the TLS handshake are exchanged between a user and the gateway; and
providing the recording of the at least sufficient portion of messages to a service provider, wherein all messages provided are digitally signed,
wherein access to the service provider is based on the at least sufficient portion of the messages.

17. The machine-readable storage medium of claim 16, wherein the service provider re-verifies the validity of the TLS handshake in order to provide access.

18. The machine-readable storage medium of claim 16, wherein performing a TLS handshake further comprises:
performing a first handshake without client authentication; and
upon successful completion of said performing a first handshake, performing a second handshake with client authentication.

19. The machine-readable storage medium of claim 18, wherein the second handshake is encrypted by a session key derived from said second handshake.

20. The machine-readable storage medium of claim 16, wherein timestamp data is embedded in at least one of the messages of the TLS handshake and the wherein access to the service provider is based on the timestamp data and the at least sufficient portion of the messages.

* * * * *